(12) United States Patent
McCall (10) Patent No.: US 12,487,733 B1
(45) Date of Patent: *Dec. 2, 2025

(54) RELATIONSHIP QUALITY EVALUATION AND REPORTING SYSTEM AND METHOD

(71) Applicant: RELAPHI, LLC, Atlanta, GA (US)

(72) Inventor: Danny McCall, Loudon, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/740,153

(22) Filed: Jun. 11, 2024

Related U.S. Application Data (63) Continuation of application No. 16/552,378, filed on Aug. 27, 2019, now Pat. No. 12,008,224, which is a continuation of application No. 14/507,674, filed on Oct. 6, 2014, now Pat. No. 10,394,430, which is a continuation of application No. 13/211,584, filed on Aug. 17, 2011, now Pat. No. 8,856,214.

(60) Provisional application No. 61/374,601, filed on Aug. 17, 2010.

(51) Int. Cl.
 *G06F 3/04842* (2022.01)
 *G06F 3/0481* (2022.01)
 *G06Q 10/0639* (2023.01)

(52) U.S. Cl.
 CPC ........ *G06F 3/04842* (2013.01); *G06F 3/0481* (2013.01); *G06Q 10/06393* (2013.01)

(58) Field of Classification Search
 CPC .............. G06F 3/04842; G06F 3/0481; G06Q 10/06393
 See application file for complete search history.

(56) References Cited

U.S. PATENT DOCUMENTS

| | | | | |
|---|---|---|---|---|
| 2005/0222993 | A1* | 10/2005 | Ohtomo | G06F 16/34 707/E17.093 |
| 2009/0271210 | A1* | 10/2009 | Lange | G06Q 10/10 705/322 |
| 2012/0069131 | A1* | 3/2012 | Abelow | G06Q 30/0601 345/589 |
| 2012/0130915 | A1* | 5/2012 | Diaz | G06Q 10/1053 705/321 |

* cited by examiner

*Primary Examiner* — David R Lazaro
*Assistant Examiner* — Mariegeorges A Henry
(74) *Attorney, Agent, or Firm* — Wayne Edward Ramage; Baker Donelson (57) ABSTRACT

A system for relationship information evaluation and management. The system incorporates relationship quality parameters that define the contextual parameters of quality, which are mutually validated and are accepted by the respective parties within an existing or prospective relationship. A computer, computing device, written documents or other means are used to capture the perspectives of each person, representative, or entity within the relationship or prospective relationship. The information or data may then be analyzed and coalesced into a meaningful whole (or segments thereof), which may then be archived, printed, reported, and presented to one or both of the parties, or others. All information collected can be further applied or aggregated within an organization (or beyond, such as in a general locality or marketplace).

16 Claims, 12 Drawing Sheets

RELATIONSHIP QUALITY EVALUATION AND REPORTING SYSTEM AND METHOD

This application is a continuation of U.S. patent application Ser. No. 16/552,378, filed Aug. 27, 2019, which is a continuation of U.S. patent application Ser. No. 14/507,674, filed Oct. 6, 2014, which is a continuation of U.S. patent application Ser. No. 13/211,584, filed Aug. 17, 2011, which claims benefit of and priority to U.S. Provisional Application No. 61/374,601, filed Aug. 17, 2010, and is entitled to those filing dates for priority. The specifications, figures and complete disclosures of U.S. patent application Ser. No. 16/552,378, 13/211,584 and 14/507,674, and U.S. Provisional Application No. 61/374,601, are incorporated herein in their entireties by specific reference for all purposes.

FIELD OF INVENTION

This invention relates to a system and method for evaluating and reporting on the quality and status of relationships, including, but not limited to, workplace relationships.

BACKGROUND OF THE INVENTION

There are many forms of relationships important to individual lives, businesses and society. Examples of such relationships are marriage and family, work and business, and institutional and political. These relationships vary in their quality, i.e., the combination of the respective value or benefit the respective parties are gaining (separately and together) from the relationship at any period or moment of time. However, information as to the current circumstances of quality and the trends of quality within these relationships typically may be somewhat unknown or unconsidered, based upon limited, subjective perspectives, or include inaccurate assumptions by one, or both, of the parties.

Relationship quality, as described herein, refers to, within an affiliation of, or contextual connection of, people, or people and entities, the measurement of the magnitude of value being gained from that affiliation at a moment or period in time, based upon acceptable parameters of benefit as separately determined by each party, then combined holistically into a singular format that informs both parties, or others, for their benefit and utility.

The absence of continuously updated information of relationship quality leads to lost opportunities and misunderstandings, as well as to acute or chronic problems and unfortunate surprises within personal, commercial, institutional and political settings. There are attempts to address the problem historically; for example, workplaces use the convention of periodic "performance reviews" in limited, unidirectional attempts to convey the organization's perspective of quality from its viewpoint to the worker, while separately, the organization may seek to learn of the worker's viewpoint through "satisfaction surveys." Unfortunately, these discrete approaches fail to accurately reveal the realities of the comprehensive and bidirectional nature of relationship quality.

Furthermore, there are needs of other third parties or persons to have more reliable and complete information about the quality of relationships within communities than is at present available. Examples include, but are not limited to, organizational leaders or marriage counselors.

In addition, in the absence of information about the quality of specific relationships, it is not possible to enjoy the additional benefit of using collectively-gathered information as reference or comparison for evaluating or judging the relative quality of a relationship or group of relationships against other similar relationships. Similarly, this information cannot be effectively used to better understand a particular relationship or relationships. Information regarding the respective views or perspectives of relationship quality would be of significant benefit in advance of entering or consummating relationships. This would provide value in various contexts, such as workplace hiring decisions, or premarital relationship prediction and decision guidance.

SUMMARY OF INVENTION

In various embodiments, the present invention comprises a system for relationship information evaluation and management. In one embodiment, the system comprises an information construct or architecture incorporating relationship quality parameters that define the contextual parameters of quality, which are mutually validated and are accepted by the respective parties (A, B) within an existing or prospective relationship. This is done from the viewpoints of each party's definition of quality, whether the parties' respective views of quality (including requirements and needs) are symmetrical or asymmetrical in nature. Each parameter provides a structure for each party to consider, express and input the magnitude of quality experiences for any point in time, or period of time.

A computer, computing device, written documents or other means are used to capture the perspectives of each person, representative, or entity within the relationship or prospective relationship. This can be done automatically, on a random, periodic, or scheduled basis, or upon manual initiation. This includes capturing each person's estimates of the other person's or entities' perspectives of quality within the relationship or prospective relationship, which may be based upon an information construct formed from the information obtained. The information or data may then be analyzed and coalesced into a meaningful whole (or segments thereof), which may then be archived, printed, reported, and presented to one or both of the parties, or others. The information can be processed and stored based upon certain parameters, attributes, types or classes or relationships, so as to provide history, patterns, trends, alerts, warnings, analyses or comparisons concerning relationship quality. This may be done on an information platform or mechanism that is neutral and independent of either party, and operates without bias toward any party.

In one exemplary embodiment, the present invention may be applied to work relationships existing between an organization and a worker or a prospective candidate. The system comprises a simple, yet highly-effective, means to capture, monitor/report and provide analytics related to the quality of a workplace relationship, comprising an automated, periodic, computer-based, online means to separately poll both worker and the organization's representative, such as a manager or supervisor, for their current viewpoints as to the quality of their relationship, as related to each party's respective view or perspective for each parameter of quality. Work relationship quality parameters for the worker or candidate include, but are not limited to, the following: functional satisfaction or enjoyment; social satisfaction; and life effects satisfaction. The worker also may be prompted to provide input as to their current "flow status."

The worker may optionally input additional categories of information related to parameters that impact the quality of a workplace relationship. Work relationship quality parameters for the organization include, but are not limited to, the following: producing outcomes (work outcomes, output, or productivity); conserving resources; and preventing risks (risk reduction or minimization). Thus, also captured are each party's estimates and assumptions as to how well they are performing for the other party, based on the other party's parameters of quality.

In one embodiment, the system offers five graphic choices of response for each contextual parameter of quality for each party. The five-point scale may be presented numerically (e.g., 1 to 5), alphabetically (e.g., A to E), or some other fashion (e.g., two thumbs up to two thumbs down). No alphanumeric data, narrative information, or commentary need be entered. The information may be collected periodically, such as weekly, monthly or quarterly, although some other time period may be used. In addition, the collection of information may be activated by either party on demand in some instances.

The system also may collect responses from the worker with regard to their perspective or opinion as to how well their leaders or supervisor collectively performed in certain areas (such as communications, thought, energy, substance, attentiveness, and results). The worker also may be prompted to provide information as to how well the organization's design enabled their work in certain areas (such as methods, work design, infrastructure and tools, and career competitiveness).

Similarly, the organization's representative is periodically polled as to how the worker has performed based on the organization's parameters of quality. The organization's representative also is prompted to provide their input as what the work experiences for the worker has been, based on the worker's quality parameters.

The system processes the information to achieve a unification, synthesis or integration that encompasses all applicable parameters. This becomes the relationship quality (RQ) format for both parties, and for others. All information can be stored, manipulated, archived and accessed in either a distributed or centralized database, or both.

After both parties provide their input, each receives a multi-faceted report providing information within a standardized format displaying information regarding the present quality status of the work relationship, as well as a timeline and trends as to the quality of the relationship. This monthly report may be the same for both parties. In one embodiment, the report is named "QR". The input from both parties is shown graphically by a multi-layer hexagon. The number of layers corresponds to the number of points in the scale (in the embodiment shown, five). Three of the sections of the hexagon correspond to the worker's quality parameters, while the remaining three sections correspond to the organization's quality parameters. Flow status also may be shown. In other embodiments where a different number of quality parameters are used, a different form of polygon or a circle may be used.

Each section's layers are colored from the center out to correspond to the actual input. The fill color used may differ based upon the rating. For example, if the rating is a 4 or 5, then all four or five layers may be colored green. If the rating is a 1, then the layer may be colored red, to draw attention to the poor rating. Other colors, such as orange, blue, and the like, may be used.

Each party's input as to their opinion about the other party's perspective on their respective quality measures also may be shown as dashed or dotted lines through the center of each section, extending out to the top of the layer corresponding to the rating. This permits the users to easily compare and contrast the different perspectives on the same relationship quality measures. These dashed lines can be hidden or shown by clicking on an icon or button on the screen.

The present quality (or RP threshold) ratio also may be shown. This is a simple ratio of the organizational perspective ratings total to the worker's personal perspective ratings total. In one embodiment, any rating of a 1 or 2 may be excluded.

Rating trends may also be displayed graphically. In another embodiment, organizational users are able to select groups from the enterprise's database, from which analytic information is presented regarding a selected group of relationships, such as within an organization's census. A bar is shown representing the selected aggregate average for a population input for the parameters for which input was sought (as discussed above).

All information collected can be further applied or aggregated within an organization (or beyond, such as in a general locality or marketplace) to provide referential and comparative relationship quality information about workers, organization, industries, professions, work roles, and the like. This information may be used for indices, history, comparisons, data mining and established standards related to creating and sustaining the quality work relationships.

DETAILED DESCRIPTION OF EXEMPLARY EMBODIMENTS

In various embodiments, the present invention comprises a relationship information system (RIS) with multiple components. A core component is the architecture, structure, or group of organizing principle(s) of relationship quality, encompassing the primary criteria or parameters of the various multifaceted dimensions of value, needs, requirements, and aversions of the parties in the relationship (i.e., "quality requirements" or "QR"). The parties are periodically queried or polled, via a computer or computing device, regarding their QR, thereby capturing one or more party's present subjective perspective as to the degree of needs satisfaction they are experiencing within the relationship (i.e., the portion of the QR applying or pertaining to their needs, valued elements, and aversions). The information is captured, parsed, and stored, and can be accessed under appropriate circumstances, such as by periodically being displayed or presented to one or more of the parties based upon the applicable QR construct.

Figure 1:
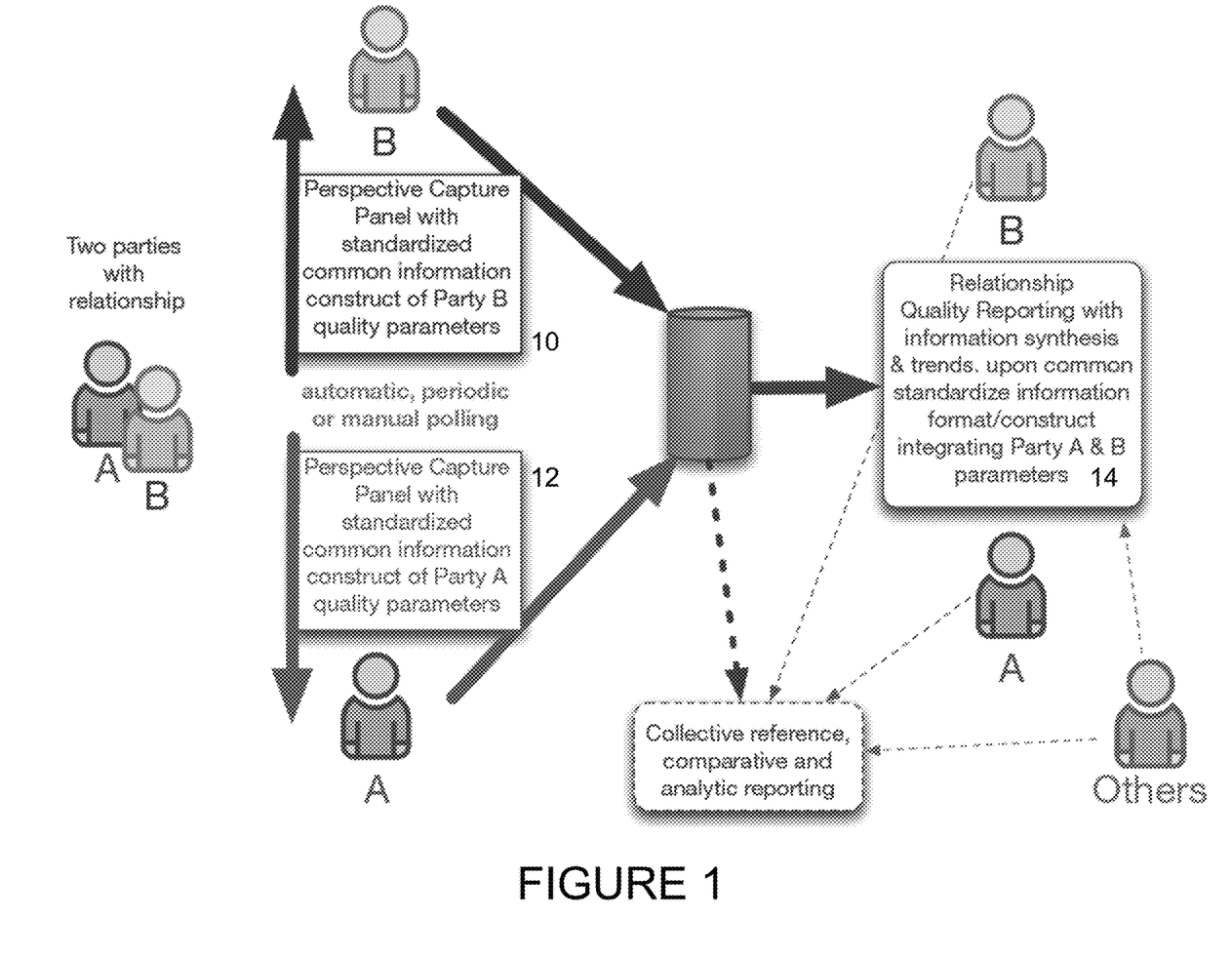
FIG. 1 shows a system in accordance with an embodiment of the present invention.

In the exemplary embodiment shown in FIG. 1, the present system comprises an information construct or architecture incorporating relationship quality parameters that define the contextual parameters of quality, which are mutually validated and are accepted by the respective parties (A, B) within an existing or prospective relationship. This is done from the viewpoints of each party's definition of quality, whether the parties' respective views of quality (including requirements and needs) are symmetrical or asymmetrical in nature. Each parameter provides a structure for each party to consider, express and input the magnitude of quality experiences for any point in time, or period of time.

A computer, computing device, written documents or other means are used to capture the perspectives of each person, representative, or entity within the relationship or prospective relationship through a perspective capture panel 10, 12. This can be done automatically, on a random, periodic, or scheduled basis, or upon manual initiation. This includes capturing each person's estimates of the other person's or entities' perspectives of quality within the relationship or prospective relationship, which may be based upon an information construct formed from the information obtained.

The information or data may then be analyzed and coalesced into a meaningful whole (or segments thereof), which may then be archived, printed, reported, and presented to one or both of the parties, or others 14. The information can be processed and stored based upon certain parameters, attributes, types or classes or relationships, so as to provide history, patterns, trends, alerts, warnings, analyses or comparisons concerning relationship quality. This may be done on an information platform or mechanism that is neutral and independent of either party, and operates without bias toward any party.

In one exemplary embodiment, the present invention may be applied to work relationships existing between an organization and a worker or a prospective candidate. The system comprises a simple, yet highly-effective, means to capture, monitor/report and provide analytics related to the quality of a workplace relationship. This is in contrast to prior art "employee satisfaction surveys" and "performance reviews." Neither of the latter separately offers accurate information correlating to the foundational quality of a workplace relationship, as both are one-sided, disconnected, and independent in information, application and consideration. The present invention rectifies this problem with an information system that unifies, captures and reports work relationship quality in a neutral, unbiased manner by defining and synthesizing the bi-directional needs and requirements of each party. This embodiment is inclusive of the significant asymmetry of the respective universal relationship parameters related to work relationship quality.

Figure 2:
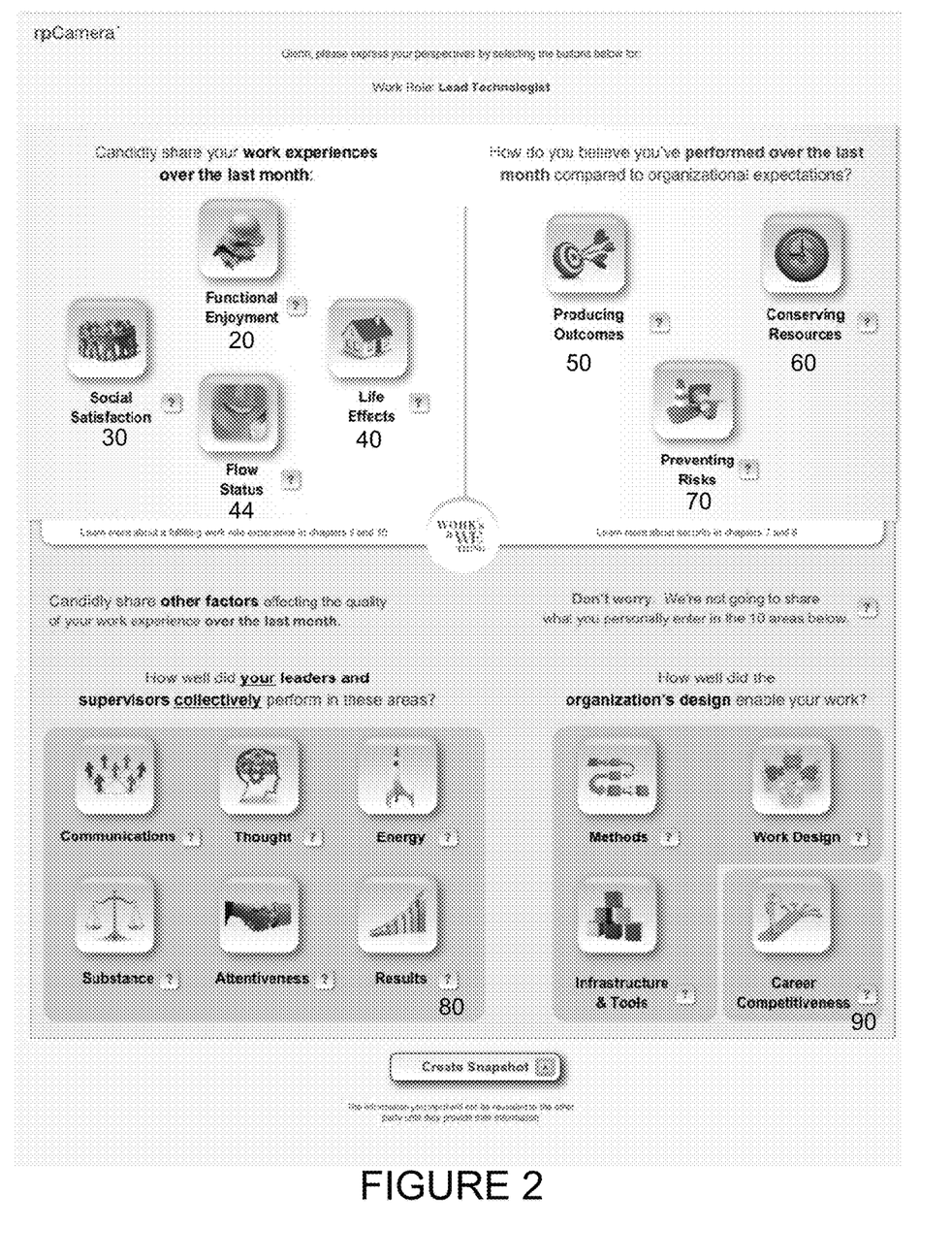
FIG. 2 shows an information collection or polling screen for an individual worker.
Figure 3:
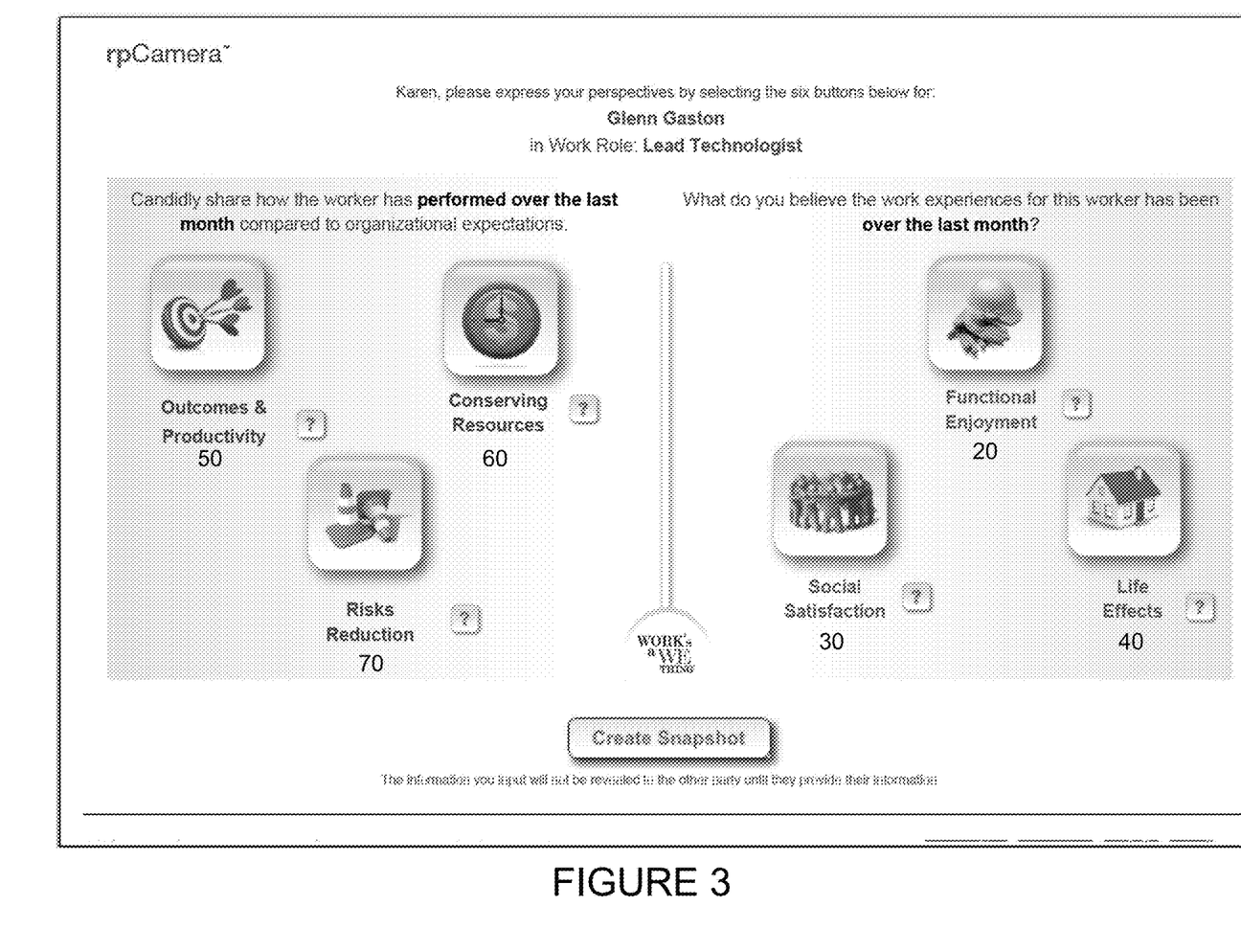
FIG. 3 shows an information collection or polling screen for a workplace manager.

In one embodiment, as seen in FIGS. 2 and 3, the system comprises an automated, periodic, computer-based, online means to separately poll both worker and the organization's representative, such as a manager or supervisor, for their current viewpoints as to the quality of their relationship, as related to each party's respective view or perspective for each parameter of quality. Work relationship quality parameters for the worker or candidate include, but are not limited to, the following: functional satisfaction or enjoyment 20; social satisfaction 30; and life effects satisfaction 40. The worker also may be prompted to provide input as to their current "flow status." 44.

The worker may optionally input additional categories of information related to parameters that impact the quality of a workplace relationship. Work relationship quality parameters for the organization include, but are not limited to, the following: producing outcomes (work outcomes, output, or productivity) 50; conserving resources 60; and preventing risks (risk reduction or minimization) 70. Thus, also captured are each party's estimates and assumptions as to how well they are performing for the other party, based on the other party's parameters of quality 50, 60, 70.

Figure 12:
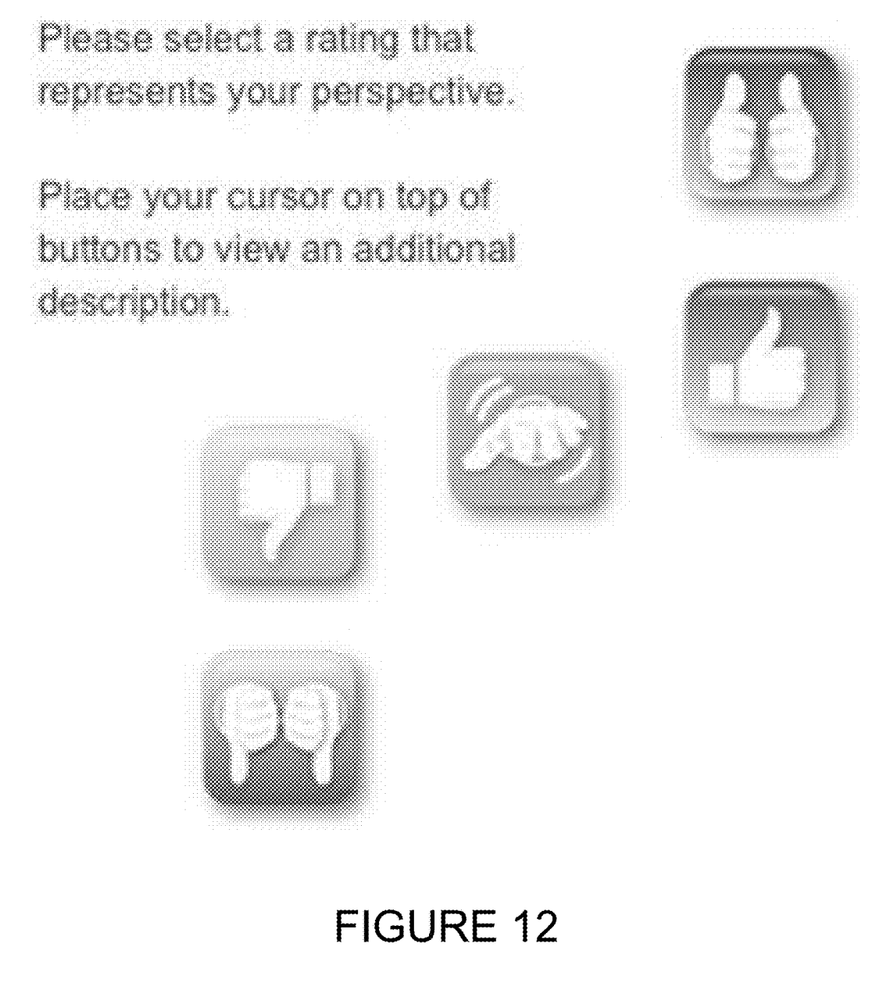
FIG. 12 shows hand icons used in one type of polling interface.

In one embodiment, referred to herein as "rpCamera" (see FIGS. 2 and 3), the system offers five graphic choices of response for each contextual parameter of quality for each party. The five-point scale may be presented numerically (e.g., 1 to 5), alphabetically (e.g., A to E), or some other fashion (e.g., two thumbs up to two thumbs down, as shown in FIG. 12). No alphanumeric data, narrative information, or commentary need be entered. The information may be collected periodically, such as weekly, monthly or quarterly, although some other time period may be used. In addition, the collection of information may be activated by either party on demand in some instances.

The system also may collect responses from the worker with regard to their perspective or opinion as to how well their leaders or supervisor collectively performed in certain areas (such as communications, thought, energy, substance, attentiveness, and results) 80. The worker also may be prompted to provide information as to how well the organization's design enabled their work in certain areas (such as methods, work design, infrastructure and tools, and career competitiveness) 90.

Similarly, as shown in FIG. 3, the organization's representative is periodically polled as to how the worker has performed based on the organization's parameters of quality 50, 60, 70. The organization's representative also is prompted to provide their input as what the work experiences for the worker has been, based on the worker's quality parameters 20, 30, 40.

The system processes the information to achieve a unification, synthesis or integration that encompasses all applicable parameters. This becomes the relationship quality (RQ) format for both parties, and for others. All information can be stored, manipulated, archived and accessed in either a distributed or centralized database, or both.

After both parties provide their input, each receives a multi-faceted report providing information within a standardized format displaying information regarding the present quality status of the work relationship, as well as a timeline and trends as to the quality of the relationship. This monthly report may be the same for both parties. In one embodiment, the report is named "QR", as seen in FIG. 4.

Figure 4:
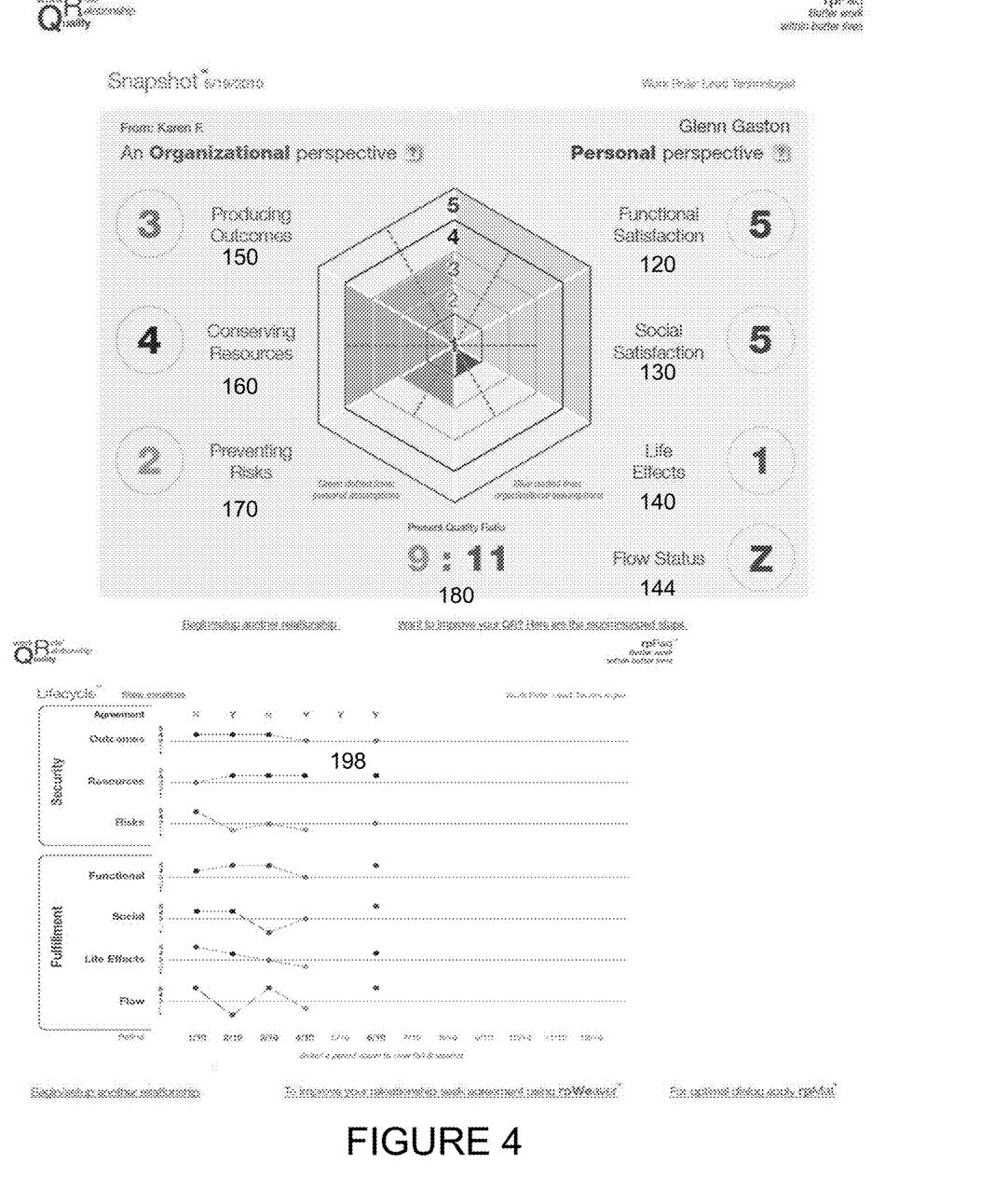
FIG. 4 shows an example of a relationship quality report.
Figure 5:
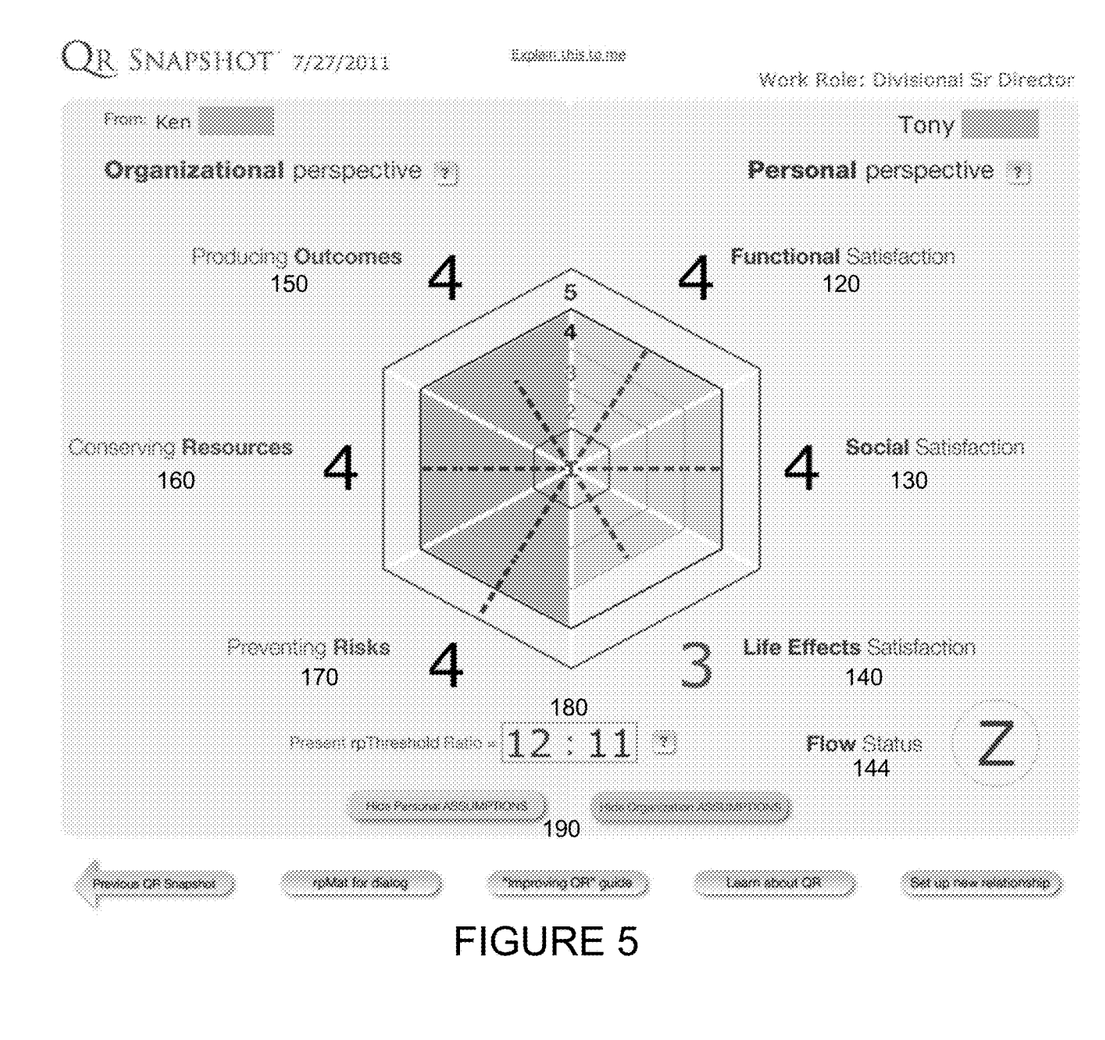
FIG. 5 shows another example of a relationship quality report.

In the embodiment shown in FIGS. 4 and 5, the input from both parties is shown graphically by a multi-layer hexagon. The number of layers corresponds to the number of points in the scale (in the embodiment shown, five). Three of the sections of the hexagon correspond to the worker's quality parameters 120, 130, 140, while the remaining three sections correspond to the organization's quality parameters 150, 160, 170. Flow status 144 also may be shown. In other embodiments where a different number of quality parameters are used, a different form of polygon or a circle may be used.

Each section's layers are colored from the center out to correspond to the actual input. For example, the worker ("Glenn Gaston") has given his functional satisfaction a two-thumb's up score, which is translated to be a 5 on a five-point scale. This is graphically represented by coloring the first four layers of the section of the hexagon corresponding to functional satisfaction. As shown, the numeric rating can be in or near the section. The fill color used may differ based upon the rating. For example, if the rating is a 4 or 5, then all four or five layers may be colored green. If the rating is a 1, then the layer may be colored red, to draw attention to the poor rating. Other colors, such as orange, blue, and the like, may be used.

Each party's input as to their opinion about the other party's perspective on their respective quality measures also may be shown. In FIGS. 4 and 5, for example, these are shown as dashed or dotted lines through the center of each section, extending out to the top of the layer corresponding to the rating. For example, in FIG. 4, the organization's representative ("Karen F.") responded that Glenn Gaston's functional satisfaction was a 4, which is shown as a dashed line extending to the fourth layer. This permits the users to easily compare and contrast the different perspectives on the same relationship quality measures. In the embodiment shown in FIG. 5, these dashed lines can be hidden or shown by clicking on an icon or button 190 on the screen.

The present quality (or RP threshold) ratio 180 also may be shown. This is a simple ratio of the organizational perspective ratings total to the worker's personal perspective ratings total. In one embodiment, any rating of a 1 or 2 may be excluded.

Rating trends 198 may also be displayed graphically, as seen in FIG. 4. In the embodiment shown, a simple trend line is shown for the ratings input for the first half of a year.

Figure 6:
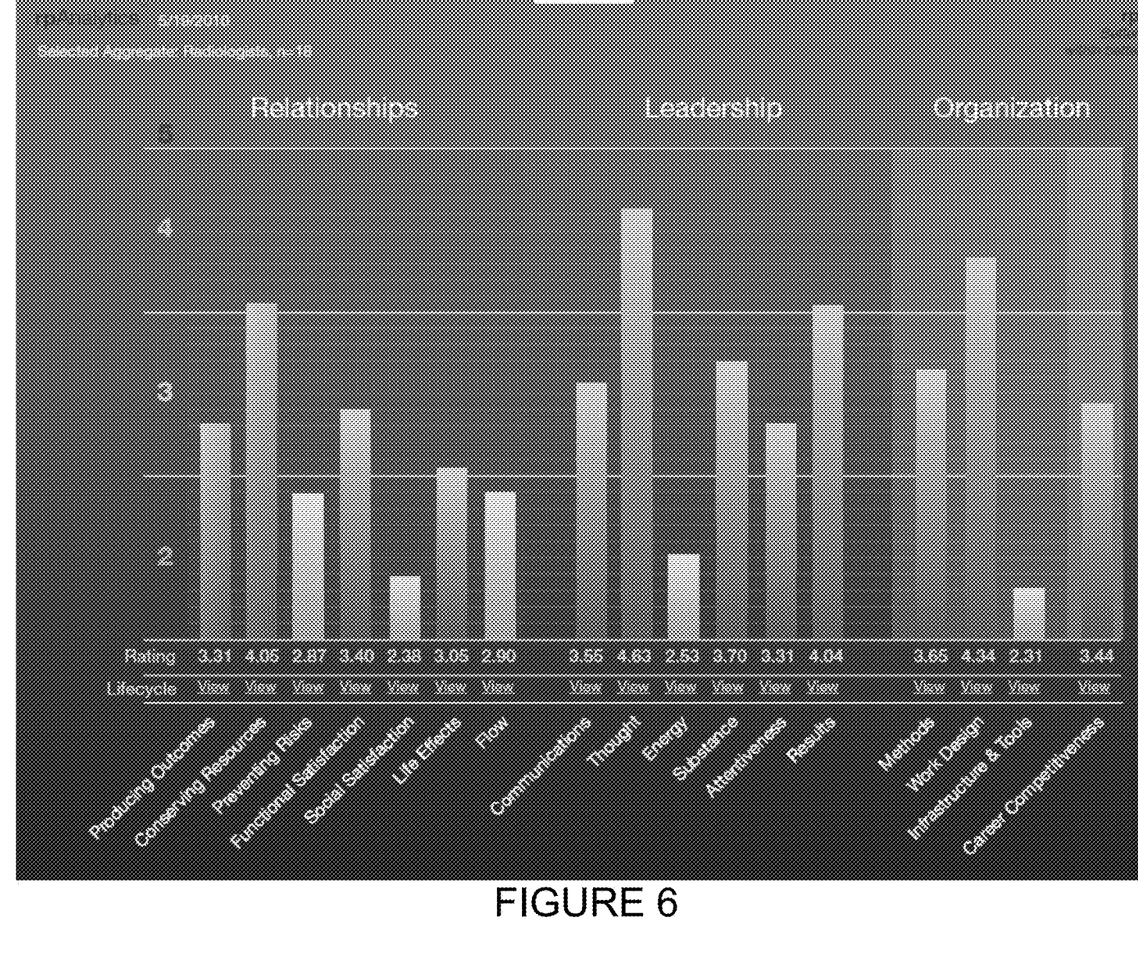
FIG. 6 shows an example of an analytical chart for a group of relationships.
Figure 7:
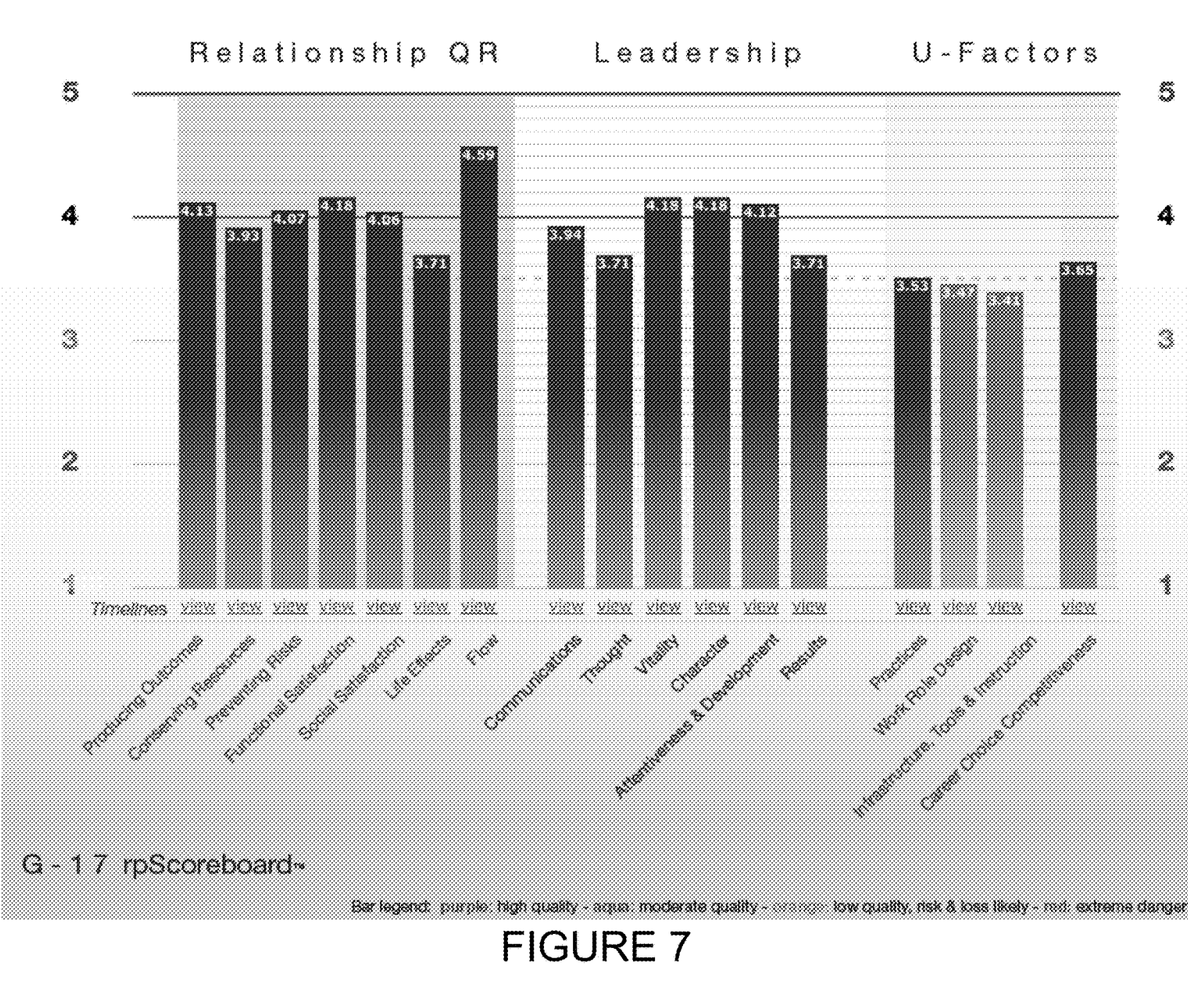
FIG. 7 shows another example of an analytical chart for a group of relationships.

In another embodiment, organizational users are able to select groups from the enterprise's database, from which analytic information is presented regarding a selected group of relationships, such as within an organization's census (as shown in FIG. 6). A specific embodiment is referred to herein as the rpAnalytics module or the rpScoreboard. A bar is shown representing the selected aggregate average for a population input for the parameters for which input was sought (as discussed above). In the example shown, the input was from 18 (i.e., n=18) radiologists at an organization. FIG. 7 shows a variation of this chart.

Figure 8:
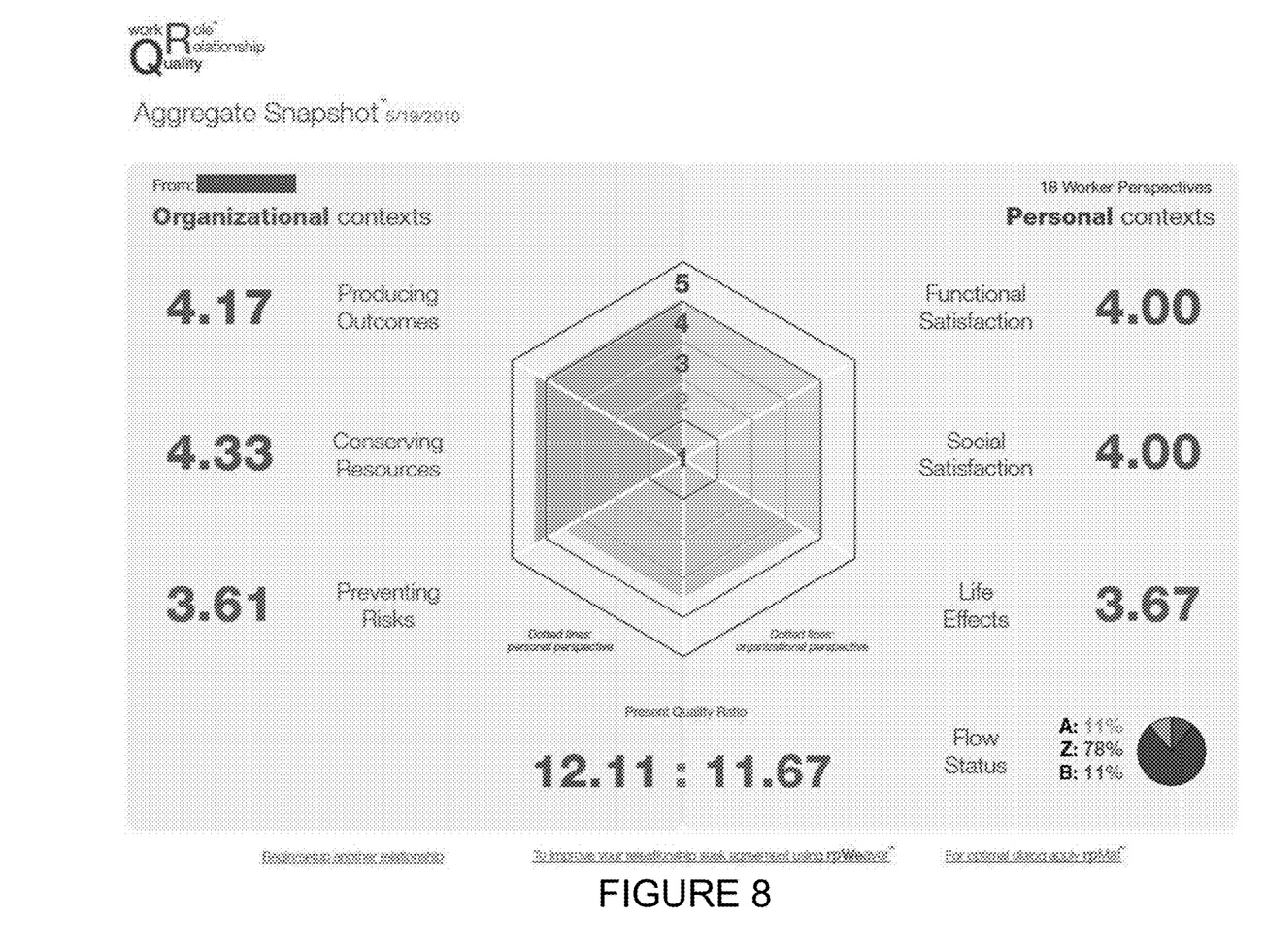
FIGS. 8 through 10 show examples of aggregated relationship quality reports.
Figure 9:
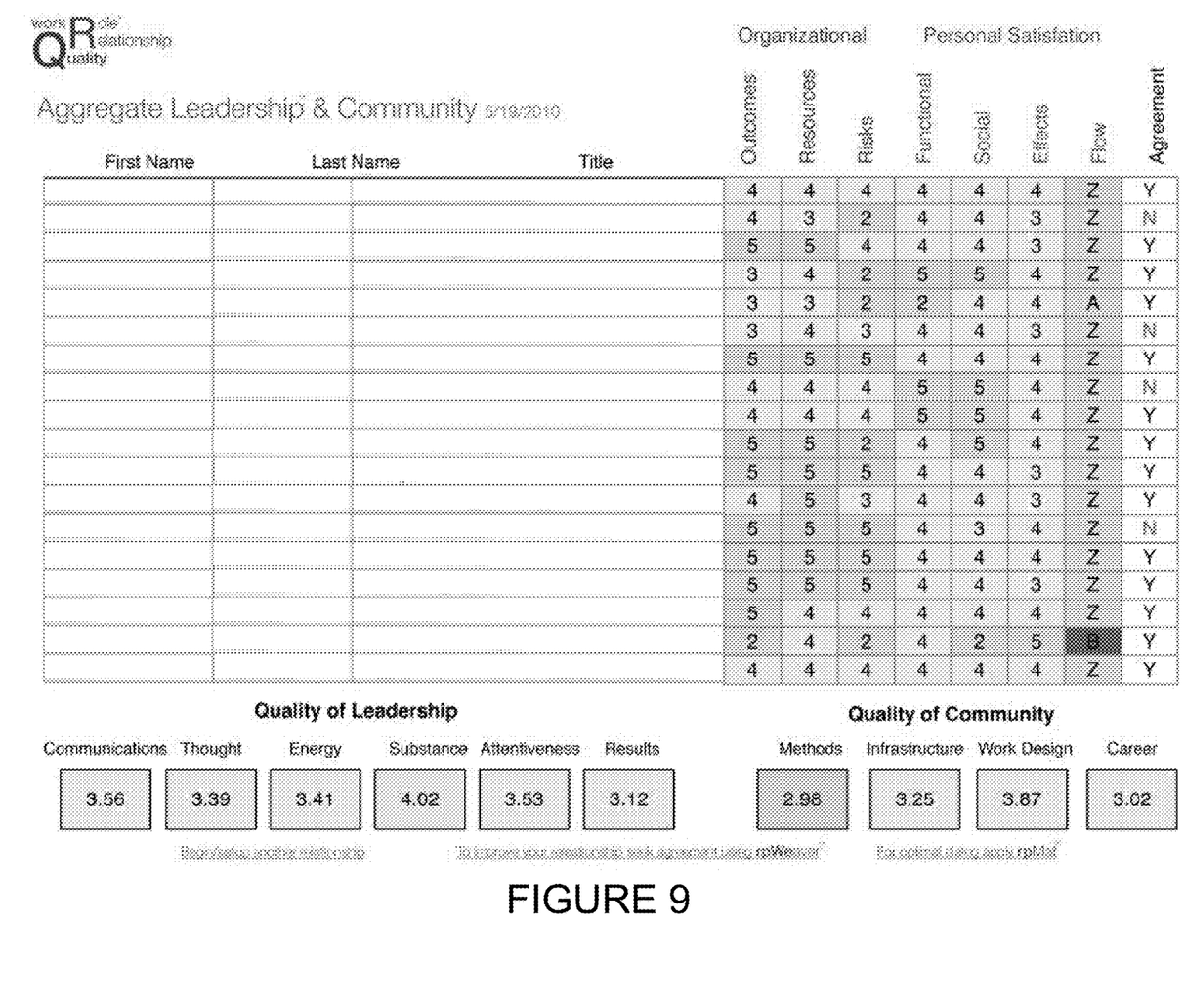
Figure 10:
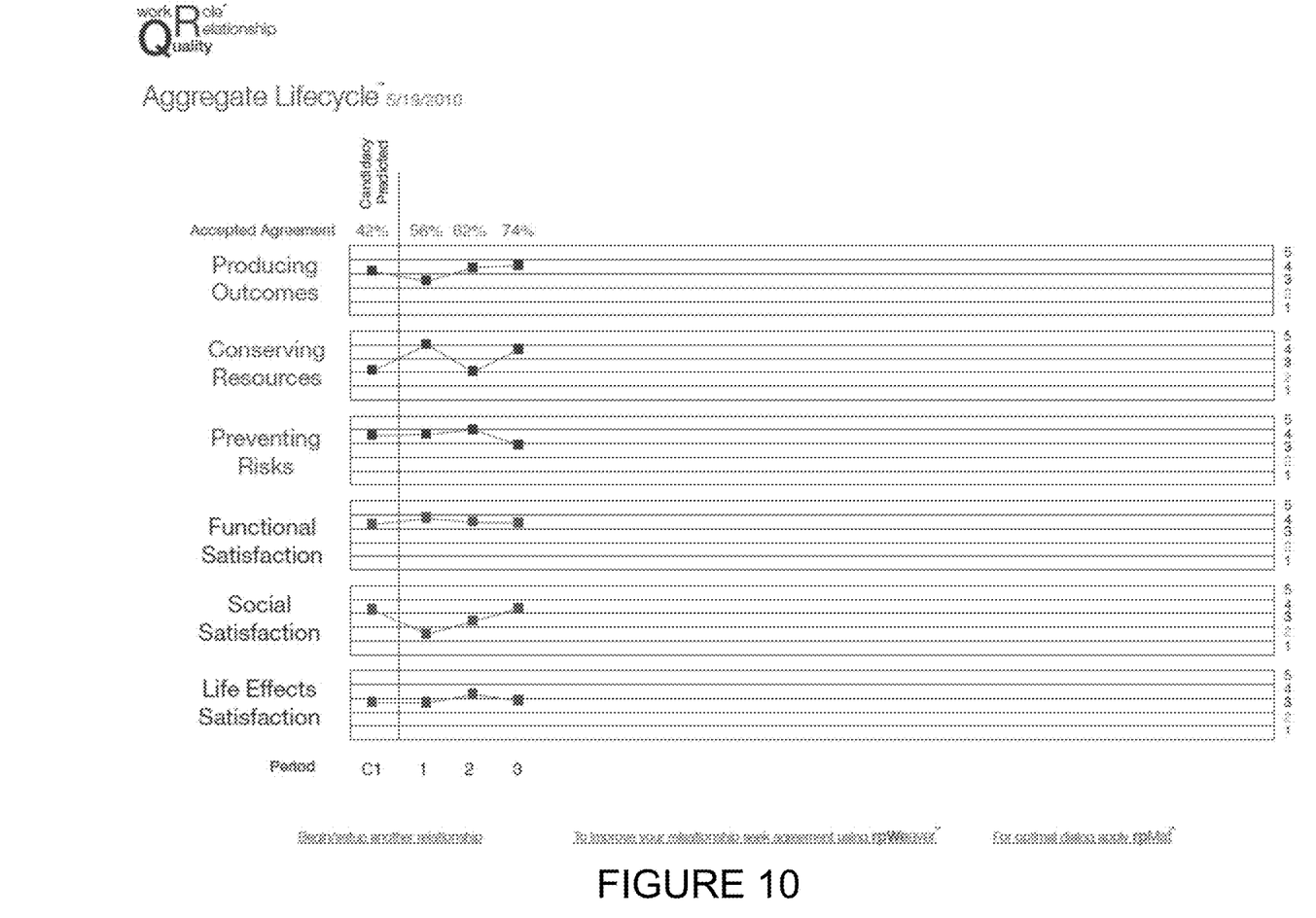

As seen in FIGS. 8 to 10, all information collected can be further applied or aggregated within an organization (or beyond, such as in a general locality or marketplace) to provide referential and comparative relationship quality information about workers, organization, industries, professions, work roles, and the like. This information may be used for indices, history, comparisons, data mining and established standards related to creating and sustaining the quality work relationships. FIG. 8, for example, shows an aggregate snapshot for eighteen workers, while FIG. 9 shows a detailed table of input from each of the workers. FIG. 10 shows the aggregate ratings trend lines over time.

Figure 11:
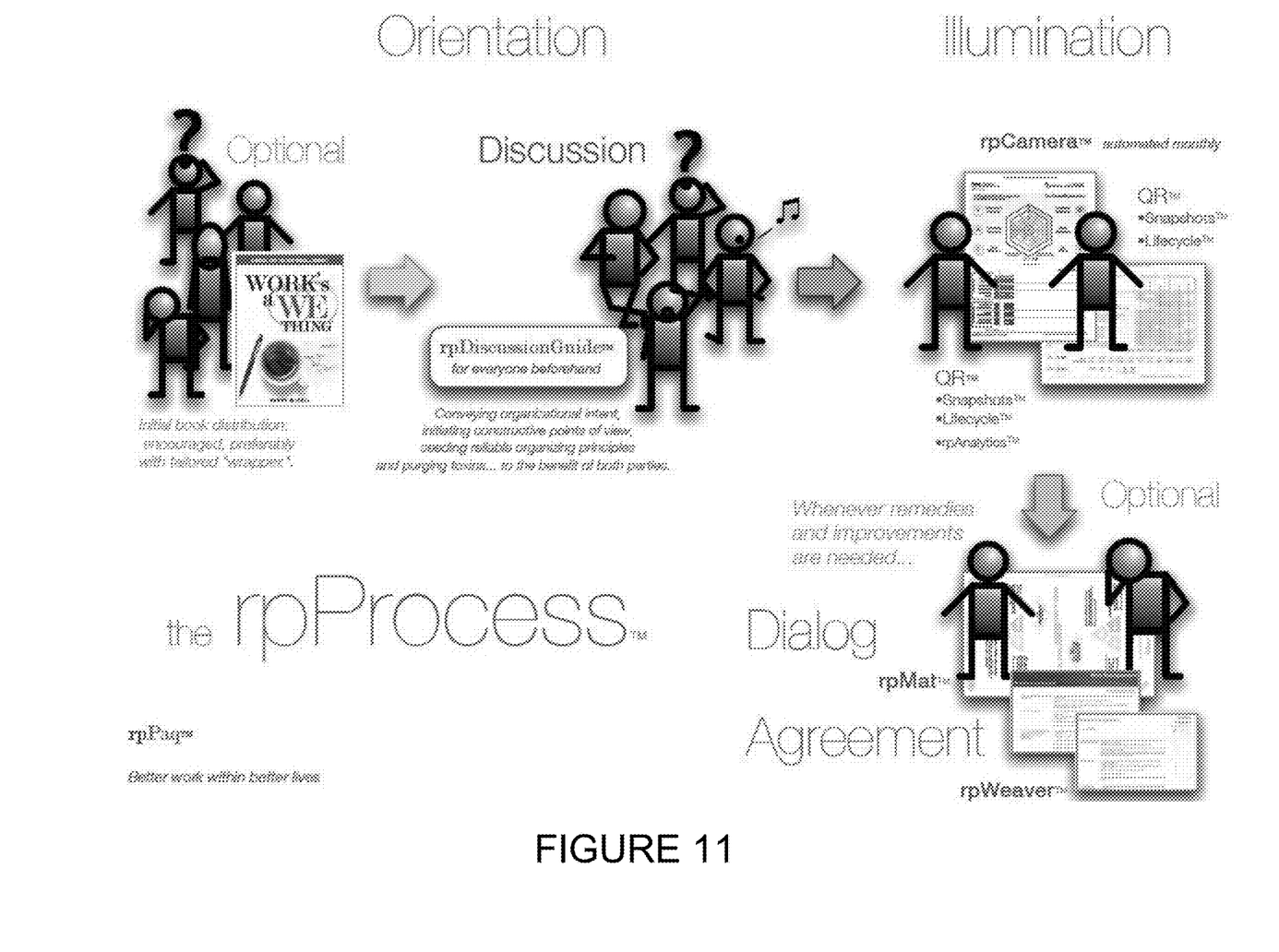
FIG. 11 shows a business process system in accordance with another exemplary embodiment of the present invention.

In another embodiment, the above system may be applied within an organization by a business process known as rpProcess (see FIG. 11). This includes, but is not limited to, preliminary orientation and discussion, and also can optionally include improvement, enrichment and remedial options made possible by the rpMat and rpWeaver systems and modules, which apply the above information constructs for facilitating dialog and agreement between worker/candidate and the organization.

In various embodiments, the system incorporates rules, user identification and rights administration system to drive optimal user behaviors (such as neither party being able to view report until both complete) and to support the varied needs of organizations, individuals and commercial business models. Computer-based embodiments may make use of local, enterprise, distributed or hosted/cloud database software platforms (such as, but not limited to, SQL, FileMaker, OpenBase), and also may make use of data visualization schemes and utilities, as well as data mining, for research and other purposes. While the system is described above in the context of a computer-based online embodiment, the present invention also can be deployed within an organization by print/paper based systems, or hybrids thereof.

Further information concerning reciprocal publishing, the Relationship Weaver, and work role yields management system may be found in U.S. Pat. Nos. 7,191,176; 7,519,594; and 7,822,634; and in U.S. patent application Ser. Nos. 11/772,026 and 12/269,840, all of which are incorporated herein by specific reference in their entireties for all purposes.

While the invention has been discussed above in the context of a hierarchical workplace relationship (i.e., worker and supervisor), the system also may be used for non-employment relationships and non-hierarchical relationships. Thus, for example, embodiments of the present invention may be used for laterals peers, teams and groups in affiliation with each other, customers and vendors, marriages, and many other forms of relationships. It also can provide online means for "n" number of communities or peers to define and express the critical parameters (i.e., key indicators) of their relationship(s), periodically poll and be appraised of the quality of each parameter, and have valued historical or predictive information utilities be provided for each parameter.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for evaluating relationship quality, comprising:
   a processor or microprocessor coupled to a memory, wherein the processor or microprocessor is programmed to:
   receive a first input from at least one user from a first group and a second input from at least one user from a second group for a rating for one or more selected relationship quality parameters, wherein at least some of the relationship quality parameters applied to the first group are different from the relationship quality parameters applied to the second group, and the at least one user from the first group has a relationship with the second group;
   display the rating data for all relationship quality parameters in a graphical format as a multilayered polygon, with each layer corresponding to a rating value for a corresponding parameter in a section of said polygon, wherein the relationship quality parameter rating from the at least one user from the first group and the at least one user from the second group are displayed on the same section of said polygon for said relationship quality parameter; and calculate a present quality ratio as the ratio of the total of the ratings from the user from the first group to the total of the ratings from the user from the second group.

2. The machine of claim 1, wherein the at least one user from the first group is prompted to provide rating input for relationship quality parameters applicable to them as a member of the first group, and to provide rating input for relationship quality parameters applicable to the second group, in the context of the relationship between the at least one user from the first group and the second group.

3. The machine of claim 1, wherein the input is received on a monthly basis.

4. The machine of claim 1, wherein the second group comprises an employer organization, and the first group comprises workers for the employer organization.

5. The machine of claim 1, wherein the relationship quality parameters for the first group comprise functional satisfaction, social satisfaction, and life effects, and the relationship quality parameters for the second group comprise producing outcomes, conserving resources, and preventing risks.

6. The machine of claim 1, wherein there are three relationship quality parameters for the first group and three relationship quality parameters for the second group.

7. The machine of claim 6, wherein the rating data for all relationship quality parameters are displayed in a multi-layered hexagon, with each layer corresponding to a rating.

8. The machine of claim 1, wherein there are five ratings possible for each relationship quality parameter.

9. The machine of claim 1, further wherein the input from multiple users from the first group are aggregated and displayed graphically.

10. A method for evaluating relationship quality, comprising the steps of:
receiving, using a processor or microprocessor, input from at least one user from a first group and at least one user from a second group for a rating for one or more selected relationship quality parameters, wherein at least some of the relationship quality parameters for the first group are different from the relationship quality parameters for the second group, and the at least one user from the first group has a relationship with the second group;
displaying the rating data for all relationship quality parameters in a graphical format as a multilayered polygon, with each layer corresponding to a rating value for a corresponding parameter in a section of said polygon, wherein the relationship quality parameter rating from the at least one user from the first group and the at least one user from the second group are displayed on the same section of said polygon for said relationship quality parameter; and
calculating a present quality ratio as the ratio of the total of the ratings from the user from the first group to the total of the ratings from the user from the second group.

11. The method of claim 10, wherein the second group comprises an employer organization, and the first group comprises workers for the employer organization.

12. The method of claim 10, wherein the relationship quality parameters for the first group comprise functional satisfaction, social satisfaction, and life effects, and the relationship quality parameters for the second group comprise producing outcomes, conserving resources, and preventing risks.

13. The method of claim 10, wherein there are three relationship quality parameters for the first group and three relationship quality parameters for the second group.

14. The method of claim 13, wherein the rating data for all relationship quality parameters are displayed in a multi-layered hexagon, with each layer corresponding to a rating.

15. The method of claim 10, wherein there are five ratings possible for each relationship quality parameter.

16. The method of claim 10, further wherein the input from multiple users from the first group are aggregated and displayed graphically.

* * * * *